United States Patent
Masaoka

(10) Patent No.: US 9,571,162 B2
(45) Date of Patent: Feb. 14, 2017

(54) NON-CONTACT POWER SUPPLY SYSTEM AND NON-CONTACT POWER SUPPLY METHOD

(75) Inventor: Shinya Masaoka, Hiroshima (JP)

(73) Assignee: THE CHUGOKU ELECTRIC POWER CO., INC., Hiroshima (JP)

( * ) Notice: Subject to any disclaimer, the term of this patent is extended or adjusted under 35 U.S.C. 154(b) by 443 days.

(21) Appl. No.: 14/342,761

(22) PCT Filed: Sep. 9, 2011

(86) PCT No.: PCT/JP2011/070564
§ 371 (c)(1),
(2), (4) Date: Mar. 4, 2014

(87) PCT Pub. No.: WO2013/035190
PCT Pub. Date: Mar. 14, 2013

(65) Prior Publication Data
US 2014/0239734 A1 Aug. 28, 2014

(51) Int. Cl.
*H04B 5/00* (2006.01)
*H02J 17/00* (2006.01)

(52) U.S. Cl.
CPC ............ *H04B 5/0037* (2013.01); *H02J 17/00* (2013.01)

(58) Field of Classification Search
CPC ........................................................ H04B 5/00
USPC ........................................................ 307/104
See application file for complete search history.

(56) References Cited

U.S. PATENT DOCUMENTS

| 7,378,939 | B2* | 5/2008 | Sengupta | H04M 1/67 340/5.53 |
| 8,045,961 | B2* | 10/2011 | Ayed | G08B 1/08 455/41.1 |
| 8,625,796 | B1* | 1/2014 | Ben Ayed | H04K 1/00 380/258 |
| 8,878,393 | B2* | 11/2014 | Kirby | 307/104 |
| 2005/0127869 | A1* | 6/2005 | Calhoon | G06F 1/26 320/108 |
| 2007/0081508 | A1* | 4/2007 | Madhavan | H04L 63/0492 370/338 |
| 2007/0182367 | A1* | 8/2007 | Partovi | H01F 5/003 320/108 |

(Continued)

FOREIGN PATENT DOCUMENTS

| JP | H04-156242 A | 5/1992 |
| JP | 2004-184078 A | 7/2004 |

(Continued)

OTHER PUBLICATIONS

Office Action issued in the counterpart Chinese Patent Application No. 201180073341.6, mailed Jan. 4, 2016 (18 pages).

(Continued)

*Primary Examiner* — Adi Amrany
(74) *Attorney, Agent, or Firm* — Osha Liang LLP

(57) ABSTRACT

A wireless power transfer system includes a transmission device that performs power supply by wireless power transfer to a power receiving device, a position acquiring section that acquires a current position of the power receiving device, and a control section that performs control to authorize the power supply in a case where the power receiving device is in a preset area and to not authorize the power supply in a case where the power receiving device is outside the preset area.

5 Claims, 15 Drawing Sheets

(56) References Cited

U.S. PATENT DOCUMENTS

| | | | |
|---|---|---|---|
| 2009/0058361 A1* | 3/2009 | John | A61N 1/3785 320/128 |
| 2009/0254766 A1* | 10/2009 | Yamasuge | H04W 8/30 713/300 |
| 2009/0264069 A1 | 10/2009 | Yamasuge | |
| 2010/0033021 A1 | 2/2010 | Bennett | |
| 2010/0044123 A1 | 2/2010 | Perlman et al. | |
| 2010/0181964 A1 | 7/2010 | Huggins et al. | |
| 2010/0225272 A1* | 9/2010 | Kirby | H04B 5/00 320/108 |
| 2010/0248622 A1* | 9/2010 | Lyell Kirby | H04B 5/0031 455/41.1 |
| 2010/0279606 A1* | 11/2010 | Hillan | H04B 5/00 455/41.1 |
| 2011/0114401 A1 | 5/2011 | Kanno | |
| 2011/0198937 A1* | 8/2011 | Tseng | H02J 5/005 307/104 |
| 2012/0001497 A1* | 1/2012 | Sada | H02J 5/005 307/104 |
| 2012/0019379 A1* | 1/2012 | Ben Ayed | G08B 13/1436 340/539.1 |
| 2012/0063505 A1* | 3/2012 | Okamura | H04B 5/0006 375/238 |
| 2012/0155136 A1* | 6/2012 | Von Novak | H02J 5/005 363/126 |
| 2012/0223589 A1* | 9/2012 | Low | H04B 5/0037 307/104 |
| 2013/0152168 A1* | 6/2013 | Nasir | H04W 12/08 726/4 |
| 2014/0327323 A1* | 11/2014 | Masaoka | H02J 17/00 307/104 |
| 2014/0354052 A1* | 12/2014 | Masaoka | H02J 17/00 307/31 |
| 2015/0028688 A1* | 1/2015 | Masaoka | H02J 17/00 307/104 |
| 2015/0229134 A1* | 8/2015 | Masaoka | H02J 17/00 307/104 |
| 2015/0255990 A1* | 9/2015 | Masaoka | H02J 7/025 307/104 |

FOREIGN PATENT DOCUMENTS

| | | |
|---|---|---|
| JP | 2005-351877 A | 12/2005 |
| JP | 2005-351878 A | 12/2005 |
| JP | 2006-023261 A | 1/2006 |
| JP | 2006-334208 A | 12/2006 |
| JP | 2007-135335 A | 5/2007 |
| JP | 2008-092704 A | 4/2008 |
| JP | 2009-189230 A | 8/2009 |
| JP | 2010-233394 A | 10/2010 |
| JP | 2010-239781 A | 10/2010 |
| WO | 2011/093291 A1 | 8/2011 |

OTHER PUBLICATIONS

Extended European Search Report in corresponding European Patent Application No. 11871902.0 mailed Mar. 23, 2015 (7 pages).
International Preliminary Report on Patentability in corresponding PCT Application No. PCT/JP2011/070564, mailed Mar. 12, 2014 (8 pages).
Notification of Reason for Refusal issued in the counterpart Korean patent application No. 10-2014-7006741, mailed Jul. 17, 2015 (4 pages).
Shinko Maekawa, "Recent trends in resonance wireless power transfer becomes clear, research is progressing but many challenges"; EETIMES Japan, Apr. 13, 2010; retrieved from "http://b.hatena.ne.jp/entry/eetimes.jp/news/3839" (4 pages).
International Search Report issued in PCT/JP2011/070564 mailed on Dec. 13, 2011 (7 pages).
Written Opinion of the International Searching Authority issued in PCT/JP2011/070564 mailed on Dec. 13, 2011 (9 pages).
Notification of Reasons for Rejection from Japanese application No. 2012-524966 dated Aug. 24, 2012 (4 pages).
Notification of Reasons for Rejection from Japanese application No. 2012-524966 dated Jan. 8, 2014 (4 pages).
Office Action mailed Jul. 8, 2015 in corresponding Chinese Patent Application No. 201180073341.6 (with translation) (21 pages).

* cited by examiner

NON-CONTACT POWER SUPPLY SYSTEM AND NON-CONTACT POWER SUPPLY METHOD

TECHNICAL FIELD

The present invention generally relates to wireless power transfer systems and wireless power transfer methods, and a technique to appropriately perform transmission from a transmission device to a power receiving device.

BACKGROUND

Patent Literature 1 describes a technique relating to wireless power transfer of a radio transmission system including a receiving power measuring section that acquires a power level of received power, a power consumption measuring section that acquires a power level of consumed power that is consumed in a device that drives with supply of power that has been received, and a power transmission control section that controls a power level of power that is transmitted via a power transmission antenna based on a difference between the acquired power level and the acquired power level.

Patent Literature 2 describes a wireless power transfer system that transmits power to an electric device, and the system sets a power source circuit with a primary coil interposed in a support body that supports the electric device, sets a load circuit with a secondary coil interposed in the electric device, and transmits power to a load circuit side from a power source circuit side by a mutual inducing effect in both coils.

Recently, with lap-top personal computers and tablet type terminals becoming widespread and with acceleration of improvement of infrastructure of electric vehicles as a background, an approach to realization of wireless power transfer with larger power and over longer distances is being promoted. For example, as described in non patent literature 1, it has been demonstrated that high efficiency power transmission is possible even when the transmission device and the power receiving device are separated by approximately a few meters.

CITATION LIST

Patent Literature

[PTL 1] Japanese Patent Laid-open Publication No. 2010-239781
[PTL 2] Japanese Patent Laid-open Publication No. 04-156242

NON PATENT LITERATURE

[NPL 1] "EETIMES Japan", "Recent trends in resonance wireless power transfer becomes clear, research is progressing but many challenges", 2010/04/13, Shinko Maekawa, "http://eetimes.jp/news/3839", Internet FIG. 23 shows a manner of indoor wireless power transfer. In a case where the transmission device and the power receiving device are in a positional relationship as shown, transmission with a transmission device 10(1) in a room 5(1) to a power receiving device 20(2) in a room 5(2) is possible, and on the contrary transmission with a transmission device 10(2) in a room 5(2) to a power receiving device 20(1) in the room 5(1) is possible, and there is a possibility that the transmission device 10 in the room 5(1) or the room 5(2) may become overloaded. Further, for example, in a case where the people living in the rooms 5(1) and 5(2) are strangers there is a danger of power theft.

In this way, with practical use of long distance wireless power transfer, an arrangement to appropriately control power supply from the transmission device to the power receiving device is required.

SUMMARY OF THE INVENTION

One or more embodiments of the present invention provide a wireless power transfer system and a wireless power transfer method that can appropriately supply power from a transmission device to a power receiving device.

In one aspect, one or more embodiments of the present invention may be a wireless power transfer system comprising:

a transmission device that performs power supply by wireless power transfer to a power receiving device;

a position acquiring section that acquires a current position of the power receiving device; and a control section that performs control to authorize the power supply in a case where the power receiving device is in a preset area and to not authorize the power supply in a case where the power receiving device is outside the area.

According to one or more embodiments of the invention, the transmission device may authorize power supply from the transmission device to the power receiving device only in a case where the power receiving device is in a preset area, thus by setting the area according to the arrangement of the transmission device and structure of the indoor wiring, overloading of the transmission device itself and overloading of the electric circuit that the transmission device belongs to can be prevented. The transmission device may not authorize power supply in a case where the power receiving device is in the area, thus receiving power (power theft) with the power receiving device outside the area can be prevented. In this way, for example, according to one or more embodiments of the invention, power supply from the transmission device to the power receiving device can be appropriately carried out.

Another aspect of one or more embodiments of the invention may be the wireless power transfer system, further comprising an authentication section that performs authentication based on authentication information that is transmitted from the power receiving device, wherein the control section authorizes the power supply in a case where the power receiving device is in the area and the authentication has succeeded.

According to one or more embodiments of the invention, for example, power supply may be authorized only in a case where the power receiving device is in the area and authentication has succeeded, thus power theft and the like can be prevented and power can be appropriately supplied from the transmission device to the power receiving device.

Another aspect of one or more embodiments of the invention may be the wireless power transfer system, further comprising an authentication section that performs authentication based on authentication information that is transmitted from the power receiving device, wherein the control section authorizes the power supply in a case where the power receiving device is outside the area and the authentication has succeeded and does not authorize the power supply in a case where the power receiving device is outside the area and the authentication has not succeeded.

According to one or more embodiments of the invention, for example, in a case where the power receiving device is outside the area, authentication may be performed and then authorization of no authorization of the power supply is decided, thus power theft and the like can be prevented and power can be supplied appropriately from the transmission device to the power receiving device.

Another aspect of one or more embodiments of the invention may be the wireless power transfer system, wherein the position acquiring section has a plurality of antennas arranged adjacent to each other, the position acquiring section receives a positioning signal from the power receiving device with the antennas, determines a direction α of the power receiving device seen from itself based on a phase difference Δθ of the positioning signal received with each of the plurality of antennas, and acquires a current position of itself based on the determined direction α.

In this way, for example, the transmission device can acquire an accurate current position of the power receiving device based on a phase difference Δθ of the positioning signal, so that the transmission device can decide accurately whether or not the power receiving device is in the area and power can be supplied appropriately from the transmission device to the power receiving device.

Another aspect of one or more embodiments of the invention may be the wireless power transfer system, wherein the power receiving device has a GPS, and the position acquiring section obtains a current position of the power receiving device by receiving from the power receiving device a current position that the power receiving device has acquired with the GPS.

According to one or more embodiments of the invention, for example, the current position of the power receiving device can be certainly acquired with a simple structure.

Another aspect of one or more embodiments of the invention may be the wireless power transfer system, wherein the control section authorizes the power supply in a case where the transmission device corresponds to specifications relating to receiving power of the power receiving device.

According to one or more embodiments of the invention, for example, power may be supplied from the transmission device to the power receiving device on in a case where the transmission device corresponds to specifications relating to receiving power of the power receiving device, thus power can be supplied safely from the transmission device to the power receiving device.

Other features of the invention will become clear with reference to modes to carry out one or more embodiments of the invention and the drawings.

According to one or more embodiments of the invention, power can be appropriately supplied from the transmission device to the power receiving device. Furthermore, one of ordinary skill in the art would appreciate that certain "sections" or "devices" of one or more embodiments of the present invention can include or be implemented by a processor or circuit.

DESCRIPTION OF EMBODIMENTS

Below, modes to carry out one or more embodiments of the invention are described with reference to the drawings.

First Embodiment

Figure 1:
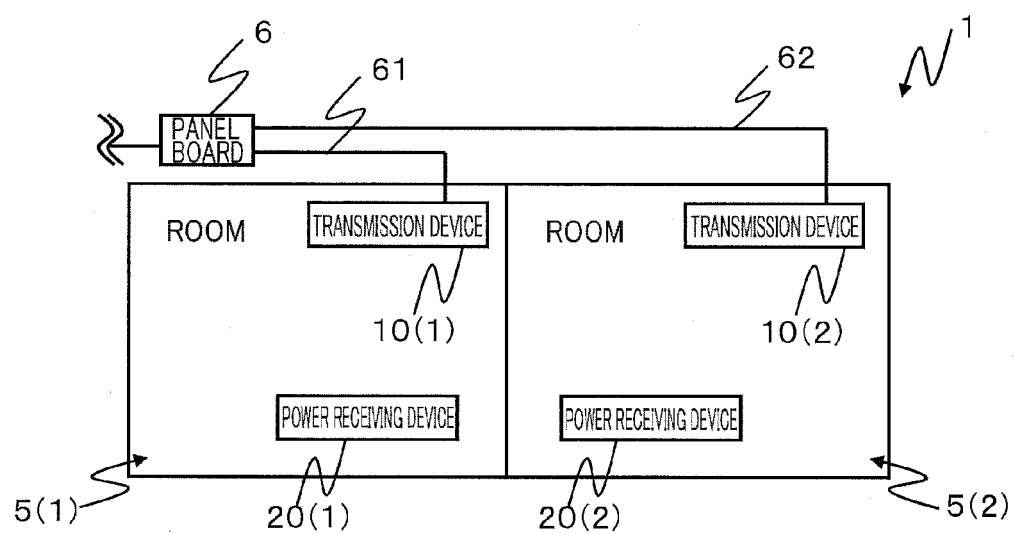
FIG. 1 describes an example of a wireless power transfer system 1 according to one or more embodiments of the invention.

FIG. 1 shows a configuration of a wireless power transfer system 1 that will be explained as a first embodiment. In the drawing, this wireless power transfer system 1 is applied to two rooms 5(1), 5(2) provided in a building such as an office building. In the figure are shown a transmission device 10(1) provided in the room 5(1) and a transmission device 10(2) provided in the room 5(2), respectively. A power receiving device 20(1) as a receiving side of wireless power transfer is in the room 5(1) and a power receiving device 20(2) as a receiving side of wireless power transfer is in the room 5(2). A power source of the transmission device 10(1) is connected to a wiring 61 linked to a panel board 6 provided in a building 8, and a power source of the transmission device 10(2) is connected to a wiring 62 linked to the panel board 6.

The wireless power transfer performed between the transmission device 10 and the power receiving device 20 are, for example, a resonance method that couples the transmission device and the power receiving device with a resonance phenomenon, an electromagnetic induction method that transmits with an electromagnetic induction principle, and a radio method of converting an electric current into an electromagnetic wave and transmitting it.

The transmission device 10(1) stores information (For example, information shown with a two-dimensional coordinate system or a three-dimensional coordinate system. Below, referred to as first transmission area information) specifying a range of the room 5(1). The transmission device 10(2) stores information (For example, information shown with a two-dimensional coordinate system or a three-dimensional coordinate system. Below, referred to as second transmission area information) specifying a range of the room 5(2). The transmission device 10 and the power receiving device 20 have a communication means that is wireless or wired).

The transmission device 10(1) of the room 5(1) obtains a current position of the power receiving device 20 when a transmission request is sent from the power receiving device 20, and compares the obtained current position and the first transmission area information and decides whether or not the power receiving device 20 is in the room 5(1). In a case where the transmission device 10(1) decides that the power receiving device 20 is in the room 5(1) the transmission device 10(1) starts power supply to the power receiving device 20, and in a case where the transmission device 10(1) decides that the power receiving device 20 is not in the room 5(1) the transmission device 10(1) does not supply power to the power receiving device 20.

On the other hand, in a case where the transmission request is transmitted from the power receiving device 20 the transmission device 10(2) in room 5(2) obtains the current position of the power receiving device 20, and by comparing the obtained current position and the second transmission area information decides whether or not the power receiving device 20 is in the room 5(2). In a case where the transmission device 10(2) decides that the power receiving device 20 is in the room 5(2) the transmission device 10(2) supplies power to the power receiving device 20, and in a case where the transmission device 10(2) decides that the power receiving device 20 is not in the room 5(2) the transmission device 10(2) does not supply power to the power receiving device 20.

In this manner, according to the wireless power transfer system 1 in this embodiment, the transmission device 10 allows supply of power from the transmission device 10 to the power receiving device 20 only in a case where the power receiving device 20 is in a preset transmission area, thus by setting this area according to an arrangement of the transmission device 10 and the structure of interior distribution, overload of the transmission device 10 itself and overload of an electric circuit that the transmission device 10 belongs to can be prevented. The transmission device 10 does not allow power supply in a case where the power receiving device 20 is outside the transmission area, thus receiving power (power theft) with a power receiving device 20 outside the transmission area can be prevented. In this way, according to the wireless power transfer system 1 of this embodiment, supplying power from the transmission device 10 to the power receiving device 20 can be appropriately performed. Below, the wireless power transfer system 1 of this embodiment will be described in more detail.

Figure 2:
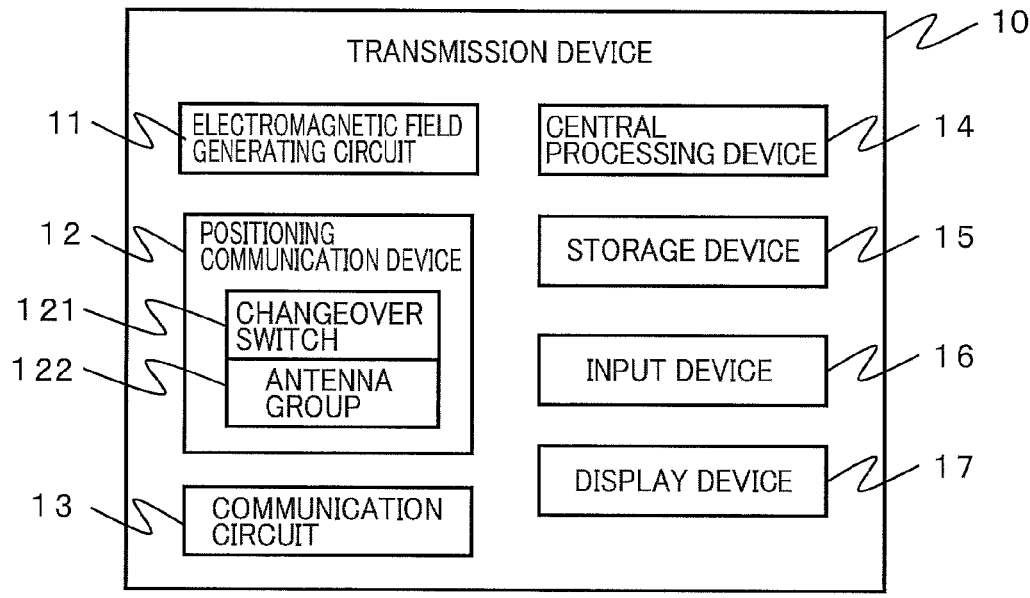
FIG. 2 describes a hardware configuration of a transmission device 10 according to one or more embodiments of the invention.

FIG. 2 shows a hardware configuration of the transmission device 10. As shown in the figure, the transmission device 10 includes an electromagnetic field generating circuit 11, a positioning communication device 12, a communication circuit 13, a central processing device 14, a storage device 15, an input device 16 and a display device 17.

The electromagnetic field generating circuit 11 generates an electromagnetic field to perform power supply from the transmission device 10 to the power receiving device 20. The electromagnetic field generating circuit 11 is configured with, for example, a high frequency power source and a power transmission coil. The positioning communication device 12 has a changeover switch 121 and an antenna group 122 and receives a wireless signal (positioning signal 700 and the like) relating to positioning to be described later.

The communication circuit 13 communicates with the power receiving device 20 by a wireless method or a wired method (such as wireless LAN (LAN: Local Area Network), Bluetooth). Note that communication between the transmission device 10 and the power receiving device 20 can be performed by such as modulating (modulation) a signal (such as a magnetic field, an electric field, an electromagnetic wave) to supply power from the transmission device 10 to the power receiving device 20 by wireless power transfer.

The central processing device 14 is configured with such as a CPU or an MPU and performs an overall control of the transmission device 10. The storage device 15 is configured with such as a RAM, ROM, NVRAM and stores program and data. The input device 16 is a touch panel, ten keys, and the like. The display device 17 is a liquid crystal display and the like.

Figure 3:
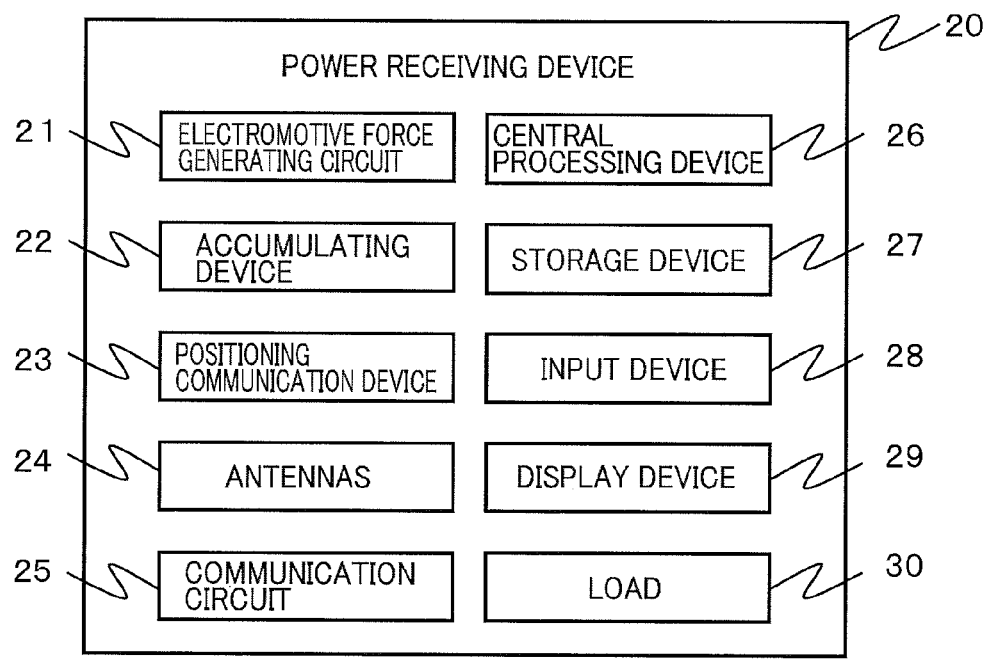
FIG. 3 describes a hardware configuration of a power receiving device 20 according to one or more embodiments of the invention.

FIG. 3 shows a hardware configuration of the power receiving device 20. As shown in the figure, the power receiving device 20 includes an electromotive force generating circuit 21, an accumulating device 22, a positioning communication device 23, an antenna 24, a communication circuit 25, a central processing device 26, a storage device 27, an input device 28, a display device 29, and a load 30.

The electromotive force generating circuit 21 is configured with a power receiving coil and the like. The electromotive force generating circuit 21 generates electromotive force with energy from the electromagnetic field sent from the transmission device 10.

The accumulating device 22 includes an accumulator battery such as a secondary battery (such as a lithium-ion battery, a lithium polymer battery, a nickel metal hydride battery, a nickel-cadmium battery) and a capacitative element (such as an electrical double-layer capacitor), a rectifying circuit that supplies a charging current based on an electromotive force generated with the electromotive force generating circuit 21, a smoothing circuit, and a transmission circuit such as a DC/AC inverter and a DC/DC converter. Note that, the power receiving device 20 does not necessarily have to have the accumulating device 22. For example, the power receiving device 20 may be configured to directly supply a current based on the electromotive force generated with the electromotive force generating circuit 21 to the load 30.

The positioning communication device 23 performs wireless communication when positioning as will be described later on. The positioning communication device 23 and the antenna 24 will be described in detail later on. The communication circuit 25 performs communication with the transmission device 10 by a wireless method or a wired method.

The central processing device 26 is configured with such as a CPU or an MPU, and performs a centralized control of the power receiving device 20. The storage device 27 is configured with such as a RAM, a ROM and a NVRAM, and stores programs and data. The input device 28 is such as a keyboard and a touch panel. The display device 29 is such as a liquid crystal panel.

The load 30 is, for example, in a case where the power receiving device 20 is a cellular telephone, a circuit (a receiving circuit, a transmitting circuit and the like) of the cellular telephone.

Figure 4:
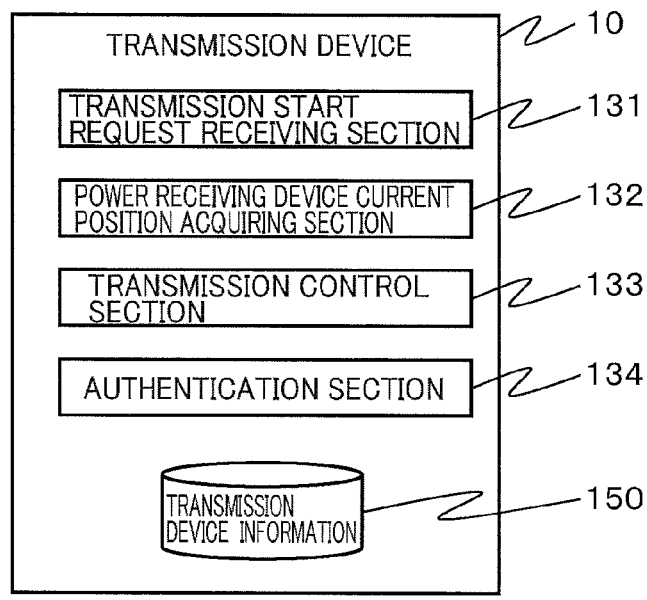
FIG. 4 describes main functions of the transmission device 10, and information that the transmission device 10 manages according to one or more embodiments of the invention.

FIG. 4 shows main functions of the transmission device 10, and main information managed by the transmission device 10. As shown in the figure, the transmission device 10 includes a transmission start request receiving section 131, a power receiving device current position acquiring section 132, a transmission control section 133, and an authentication section 134. These functions are realized by hardware of the transmission device 10 or the central processing device 14 of the transmission device 10 reading and executing programs stored in the storage device 15. As shown in the figure, the transmission device 10 manages transmission device information 150.

The transmission start request receiving section 131 receives from the power receiving device 20 a transmission start request which is a signal requesting the transmission device 10 to start power supply.

The power receiving device current position acquiring section 132 obtains the current position of the power receiving device 20 with such as a positioning function that will be described later.

The transmission control section 133 decides whether or not the current position of the power receiving device 20 acquired with the power receiving device current position acquiring section 132 is in the transmission area (an area specified by first transmission area information or second transmission area information), and in a case that the transmission control section 133 decides that the power receiving device 20 is in the transmission area the device causes the electromagnetic field generating circuit 11 to generate the electromagnetic field.

The authentication section 134 requests authentication information to the power receiving device 20 at the time of the above control with the transmission control section 133. The authentication section 134 checks authentication information transmitted from the power receiving device 20 with checking information to be described later and performs authentication.

Figure 5:
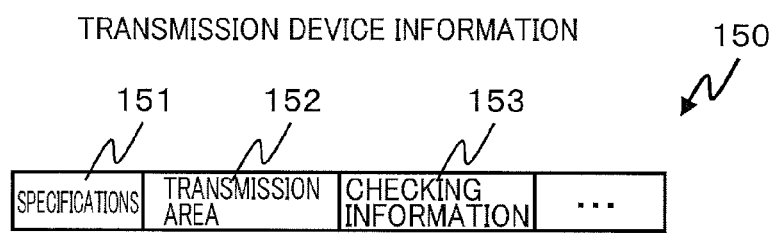
FIG. 5 describes an example of transmission device information 150 according to one or more embodiments of the invention.

FIG. 5 shows an example of the transmission device information 150 that the transmission device 10 manages. As shown in the drawing, the transmission device information 150 includes specifications 151, a transmission area 152 and checking information 153. The specifications 151 store information relating to specifications relating to transmission function of the transmission device 10 (such as supply power that can be supplied with the transmission device 10, supply voltage, supply current, resonance frequency of the transmitting coil). The transmission area 152 stores the first transmission area information or the second transmission area information described above. The checking information 153 stores information (below, referred to as checking information) to be checked with the authentication information sent from the power receiving device 20.

Figure 6:
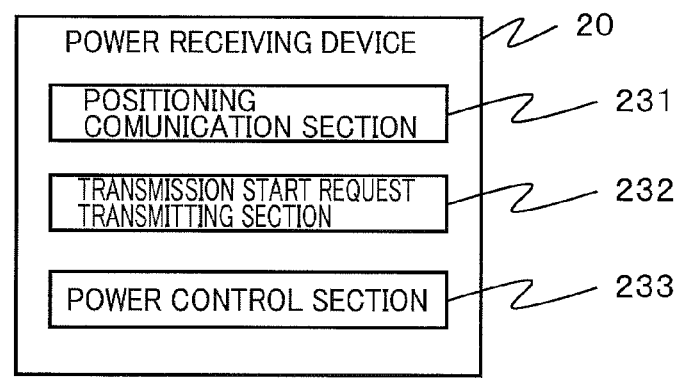
FIG. 6 describes main functions of the power receiving device 20 according to one or more embodiments of the invention.

FIG. 6 shows main functions of the power receiving device 20. As shown in the drawing, the power receiving device 20 includes a positioning communication section 231, a transmission start request transmitting section 232 and a power control section 233. The functions of the above are achieved by hardware of the power receiving device 20 or the central processing device 26 of the power receiving device 20 reading and executing programs stored in the storage device 27.

The positioning communication section 231 performs communication for positioning to be described later (such as transmission of a positioning signal 700 to be described later). The transmission start request transmitting section 232 transmits the transmission start request to the transmission device 10. The power control section 233 supplies power to the load 30 and charges the accumulating device 22 with electromotive force generated with the electromotive force generating circuit 21.

<Mechanism of Positioning>

Next, the mechanism of positioning is explained. The transmission device 10 receives the positioning signal 700 formed of a wireless signal that is a spread spectrum, which is sent from the antenna 24 of the power receiving device 20, while periodically switching between the plurality of antennas configuring the antenna group 122.

Figure 7:
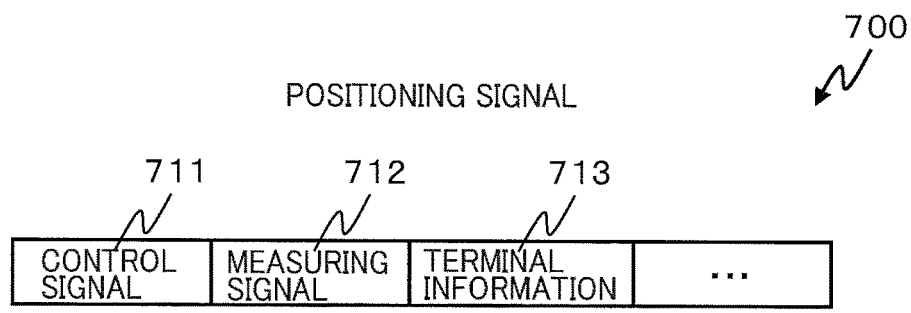
FIG. 7 shows data format of a positioning signal 700 according to one or more embodiments of the invention.

FIG. 7 is an example of a data format of the positioning signal 700 which is transmitted from the power receiving device 20. As shown in the drawing, the positioning signal 700 includes signals and information such as a control signal 711, a measuring signal 712, and terminal information 713.

The control signal 711 includes modulated waves and various control signals. The measured signal 712 includes nonmodulated waves of approximately several msec (for example, signals used for detection of a direction that the power receiving device 20 is in respect to the transmission device 10 and a relative distance of the power receiving device 20 in respect to the transmission device 10 (for example, a spread code of a 2048 chip)). The terminal information 713 includes information that identifies the power receiving device 20 (below, referred to as a power receiving device ID).

Figure 8:
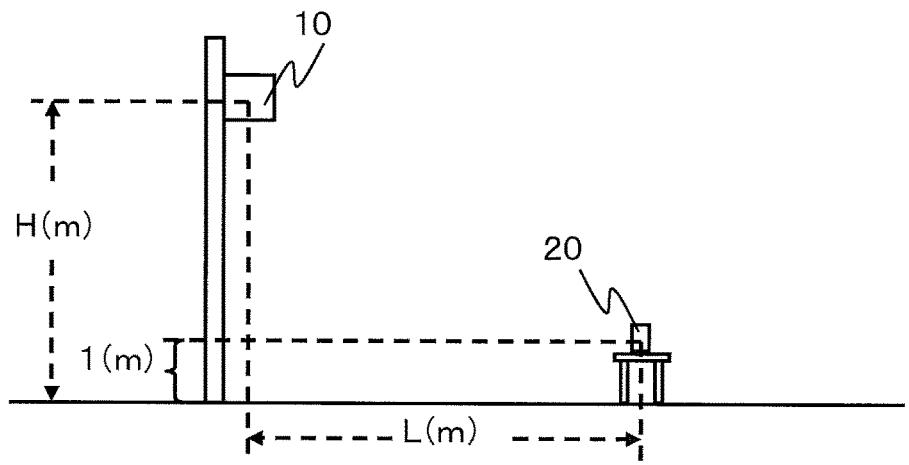
FIG. 8 describes a positional relationship between the transmission device 10 and the power receiving device 20 according to one or more embodiments of the invention.

FIG. 8 illustrates a positional relationship of the transmission device 10 and the power receiving device 20. In this example, the power receiving device 20 is in a position above the ground by 1 (m), and the transmission device 10 is fixed to a position above the ground by H(m). A slant distance from directly below the transmission device 10 to the power receiving device 20 is L(m).

Figure 9:
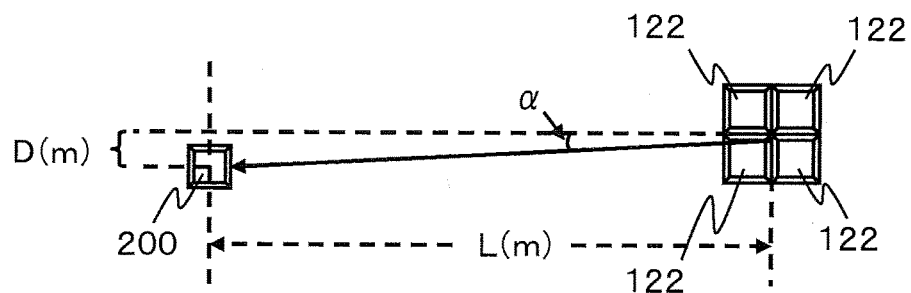
FIG. 9 describes a positional relationship between antennas configuring an antenna group 122 and the power receiving device 20 according to one or more embodiments of the invention.

FIG. 9 is a diagram explaining the positional relationship between a plurality of antennas configuring the antenna groups 122 and the power receiving device 20. As shown in the figure, in this example, the antenna groups 122 are configured with four circular polarized directional antennas arranged adjacent to each other in equal intervals in a two-dimensional plane in a substantially square shape in an interval of one wavelength or less of the positioning signal 700 (for example, in a case that the positioning signal 700 is a radio wave of a 2.4 GHz band, an interval of equal to or less than one wavelength (12.5 cm)).

In this drawing, if an angle between a horizontal direction in a height position of the antenna groups 122 and a direction of the power receiving device 20 in respect to the antenna groups 122 is α, for example, the relationship is as follows:

$$\alpha = \operatorname{arcTan}(D(m)/L(m)) = \operatorname{arcSin}(\Delta L(cm)/6\ (cm))$$

Note that, ΔL (cm) is a difference in length of transmission paths between two specific antennas, of the antennas configuring the antenna groups 122, and the power receiving device 20.

Here, in a case a phase difference of the positioning signals 700 received by two specific antennas configuring the antenna groups 122 is Δθ, there is the relationship as follows:

$$\Delta L(cm) = \Delta\theta/(2\pi/\lambda(cm))$$

Further, as the positioning signals 700, for example, in a case of using a radio wave of a 2.4 GHz band, λ≈12 (cm), therefore there is the relationship of $$\alpha = \operatorname{arcSin}(\Delta\theta/\pi)$$

Further, in a measureable range (−π/2<Δθ<π/2), α=Δθ (radian), and thus from the above equation a direction which the transmission device 10 is in can be specified.

Figure 10:
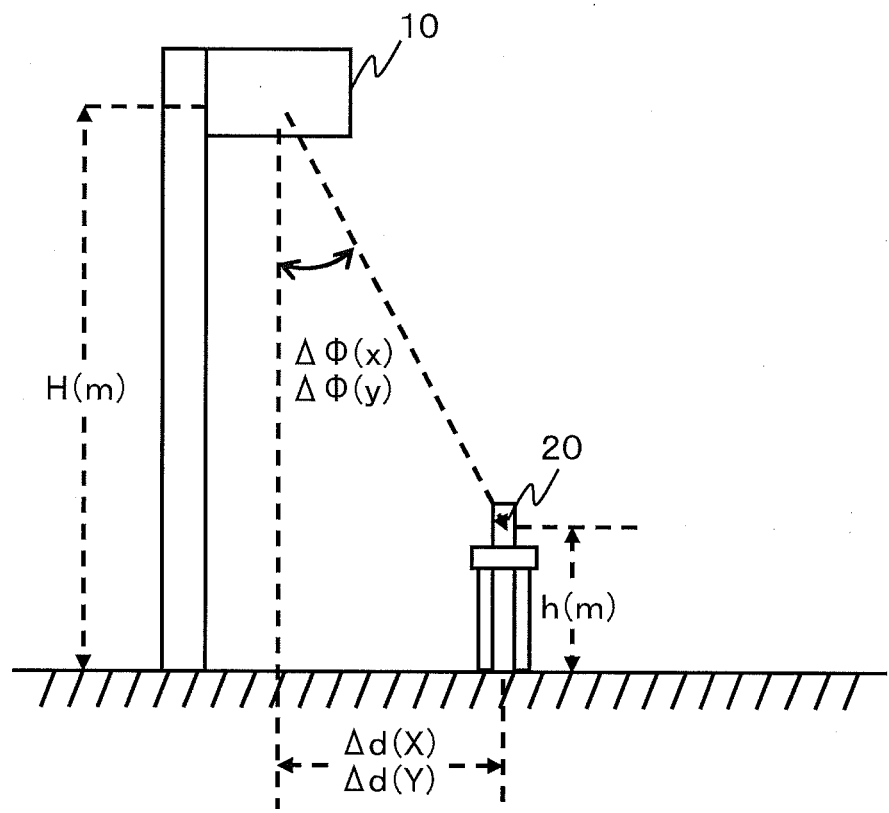
FIG. 10 shows a positional relationship between the transmission device 10 and the power receiving device 20 according to one or more embodiments of the invention.

FIG. 10 shows a positional relationship of the transmission device 10 and the power receiving device 20 in an installed location of the transmission device 10. As shown in the drawing, when the height from the ground of the antenna group 122 of the transmission device 10 is H(m), the height from the ground of the power receiving device 20 is h(m), in a case a position of a ground surface directly below the transmission device 10 is an origin and rectangular coordinate axes (x-axis, y-axis) are set, an angle between the direction from the transmission device 10 to the power receiving device 20 and the x axis is Δϕ(x) and an angle between the direction from the transmission device 10 to the power receiving device 20 and the y axis is Δϕ(y), then the position of the power receiving device 20 in respect to the origin can be obtained from the following equation.

$$\Delta d(x) = (H-h) \times \operatorname{Tan} \Delta\phi(x)$$

$$\Delta d(y) = (H-h) \times \operatorname{Tan} \Delta\phi(y)$$

Then, when the position of the origin is (X1, Y1), the current position of the power receiving device 20 (Xx, Yy) can be obtained from the following equation.

$$Xx = X1 + \Delta d(x)$$

$$Yy = Y1 + \Delta d(y)$$

The methods of positioning explained above are also explained in detail in for example, Japanese Patent Laid-open Application No. 2004-184078, Japanese Patent Laid-open Application No. 2005-351877, Japanese Patent Laid-open Application No. 2005-351878, and Japanese Patent Laid-open Application No. 2006-23261.

Note that, positioning of the power receiving device 20 may be performed by sending the positioning signal 700 from the antenna 24 of the power receiving device 20, receiving this with the antenna groups 122 of the transmission device 10 and performing positioning of the power receiving device 20, or the positioning signal 700 can be transmitted from the transmission device 10, the power receiving device 20 can receive the positioning signal 700 and perform positioning at the power receiving device 20 side and transmit the results to the transmission device 10. In the below explanation the former method is used.

<Power Supply Start Process>

Figure 11:
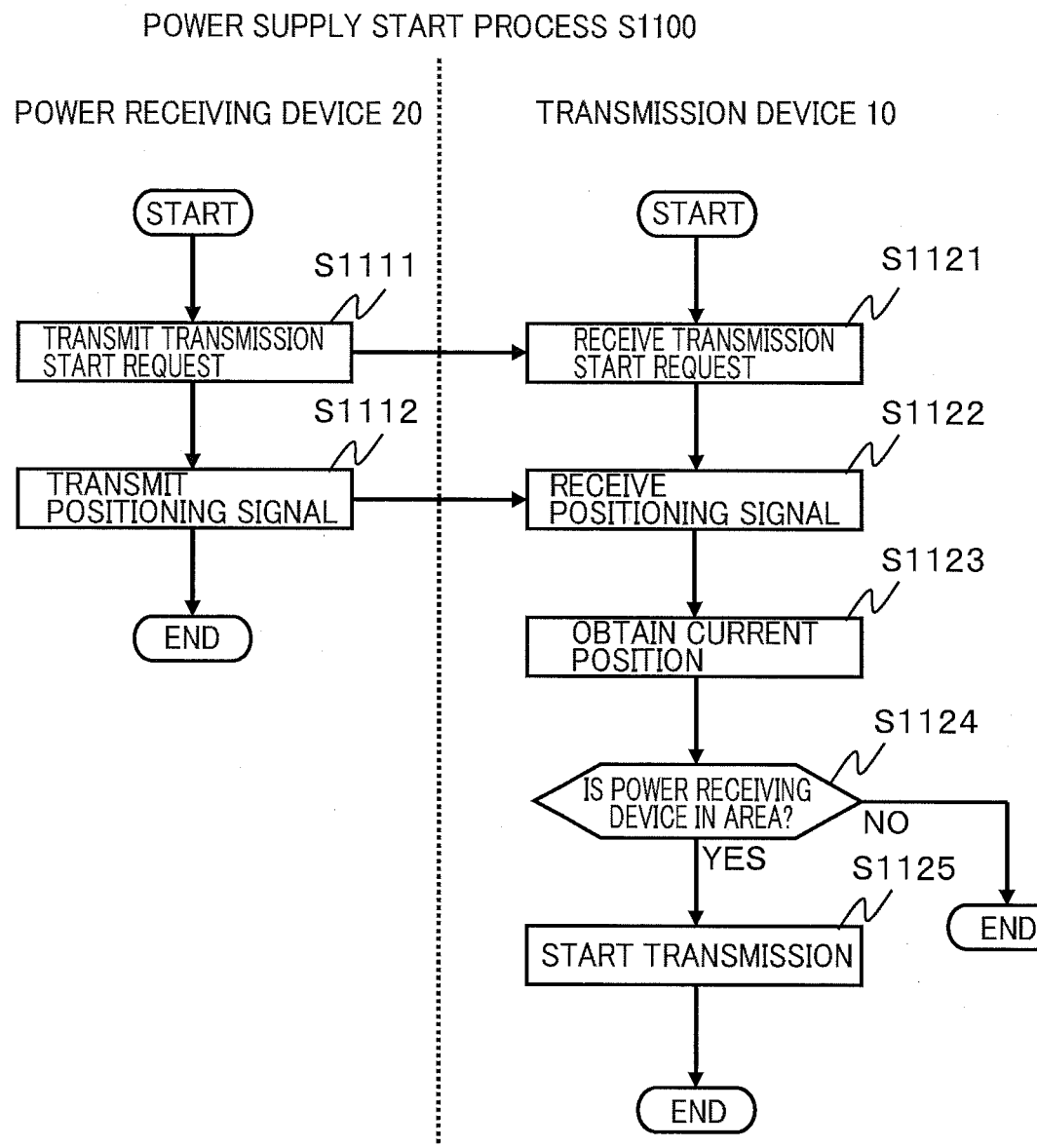
FIG. 11 is a flowchart describing a power supply start process S1100 according to one or more embodiments of the invention.

FIG. 11 is a flowchart explaining a process of starting power supply from the transmission device 10 to the power receiving device 20 (below, referred to as a power supply start process S1100) carried out with the wireless power transfer device system 1. The power supply start process S1100 is carried out, for example, in a case where a user of the power receiving device 20 inputs a predetermined operation to the power receiving device 20.

As shown in the drawing, first the power receiving device 20 transmits a transmission start request to the transmission device 10 (S1111). This transmission start request is attached with a power receiving device ID of the power receiving device 20 that is the sender. Note that, in a case that the power receiving device 20 does not have an accumulating device 22, for example, transmitting power of the above transmission start request and power for operating such as the central processing device 26 relating to executing processes and the communication circuit 25 is obtained from an electromotive force generated with an electromotive force generating circuit 21 (or such as an antenna separately provided from the electromotive force generating circuit 21) due to an electromagnetic induction effect of an electromagnetic field supplied (transmitted, irradiated) from the transmission device 10.

Subsequently, the power receiving device 20 transmits the positioning signal 700 to the transmission device 10 (S1112) and the transmission device 10 receives the positioning signal 700 (S1122).

The transmission device 10 obtains the current position of the power receiving device 20 based on the received positioning signal 700 (S1123).

Next, the transmission device 10 decides, based on the determined current position, whether or not the power receiving device 20 is in the transmission area of the transmission device 10. In a case that the power receiving device 20 is in the transmission area of the transmission device 10 (S1124: YES), the process proceeds to S1125, and in a case that the power receiving device 20 is not in the transmission area of the transmission device 10 (S1124: NO) the process ends.

In S1125, the transmission device 10 starts power supply to the power receiving device 20.

As explained above, according to the wireless power transfer system 1 of this embodiment, by setting transmission area information (first transmission area information, second transmission area information) to the transmission device 10, an overload of the transmission device 10 itself and an overload of an electric circuit that the transmission device 10 belongs to can be prevented. Further, the transmission device 10 does not allow power supply in a case where the power receiving device 20 is outside the transmission area, thus receiving power with a power receiving device 20 outside the transmission area (power theft) can be certainly prevented.

Further, the transmission device 10 determines the current position of the power receiving device 20 with a positioning mechanism described above, so that whether or not the power receiving device 20 is in the transmission area or not can be accurately determined. In this way, according to the wireless power transfer system 1 of this embodiment, power supply from the transmission device 10 to the power receiving device 20 can be appropriately carried out.

Second Embodiment

Next, a wireless power transfer system 1 of a second embodiment will be explained. Basic configurations of the wireless power transfer system 1 of the second embodiment (hardware configuration, function configuration) are similar to those in the first embodiment.

Figure 12:
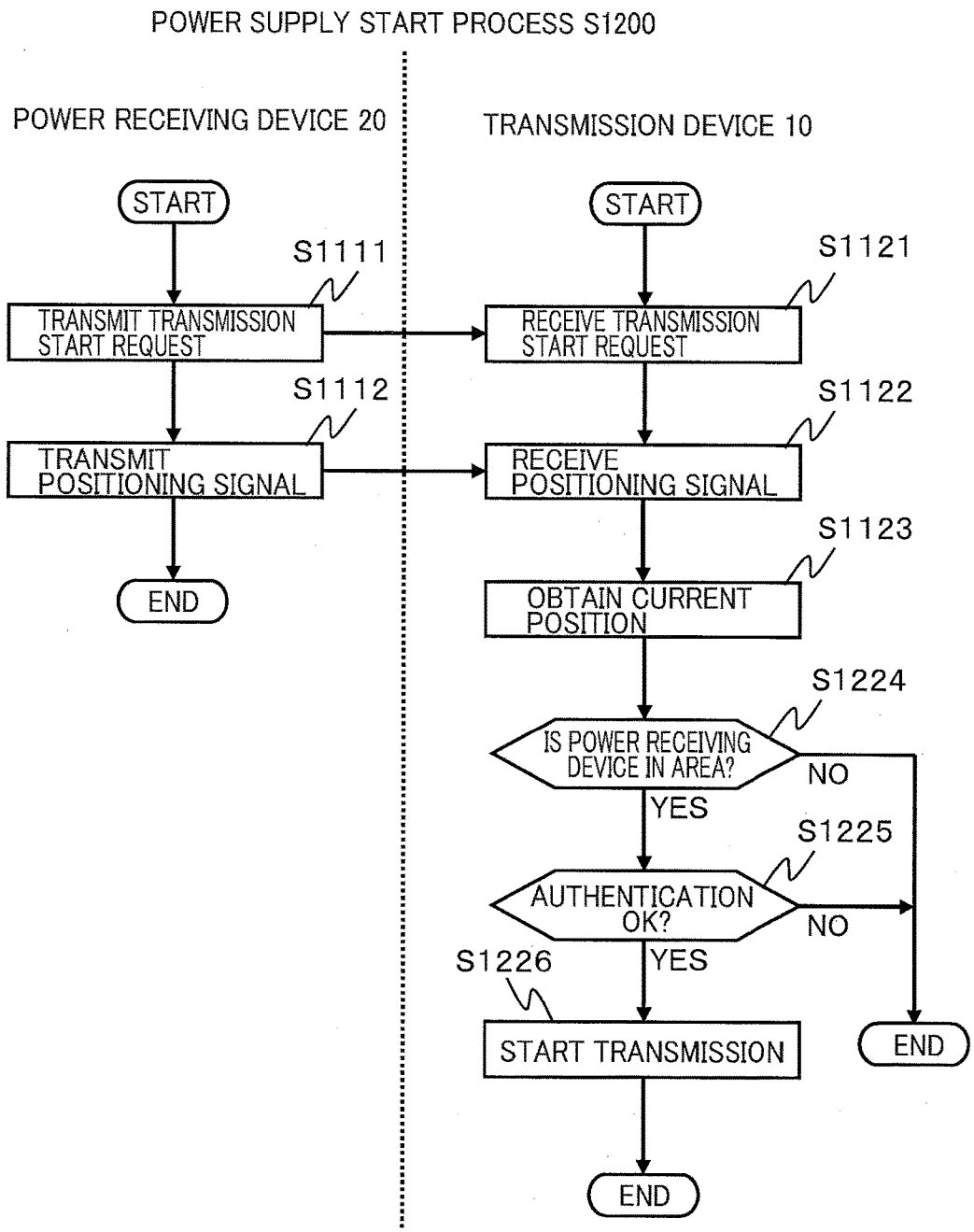
FIG. 12 is a flowchart describing a power supply start process S1200 according to one or more embodiments of the invention.

FIG. 12 is a flowchart explaining a power supply start process explained as the second embodiment (below, referred to as a power supply start process S1200). The power supply start process S1200 is carried out, for example, in a case that a user of a power receiving device 20 inputs a predetermined operation to the power receiving device 20. The processes of S1111 to S1123 in this drawing are similar to those in FIG. 11.

In S1224, based on the current position of the power receiving device 20 determined in S1123, the transmission device 10 decides whether or not the power receiving device 20 is in the transmission area of the transmission device 10. In a case where the power receiving device 20 is in the transmission area of the transmission device 10(S1224: YES) the process proceeds to S1225, and in a case where the power receiving device 20 is not in the transmission area of the transmission device 10 (S1224: NO) the process ends.

In S1225, the transmission device 10 performs authentication of the power receiving device 20. Specifically, the transmission device 10 checks authentication information transmitted from the power receiving device 20 and the checking information 153 of the transmission device 10.

In a case that authentication succeeds (S1225: YES) the process proceeds to S1226, and in a case that authentication does not succeed (S1225: NO) the process ends. Note that, in a case that authentication did not succeed, the power receiving device 20 may display to that effect.

In S1226, the transmission device 10 starts power supply to the power receiving device 20.

In this way, in the power supply start process S1200 of the second embodiment, the power receiving device 20 is in the area and power supply is allowed only in a case authentication succeeds, thus power theft of wireless power in the area can be certainly prevented.

Third Embodiment

Subsequently, a wireless power transfer system 1 in the third embodiment will be explained. A basic configuration (hardware configuration, function configuration) of the wireless power transfer system 1 in the third embodiment is similar to that in the first embodiment.

Figure 13:
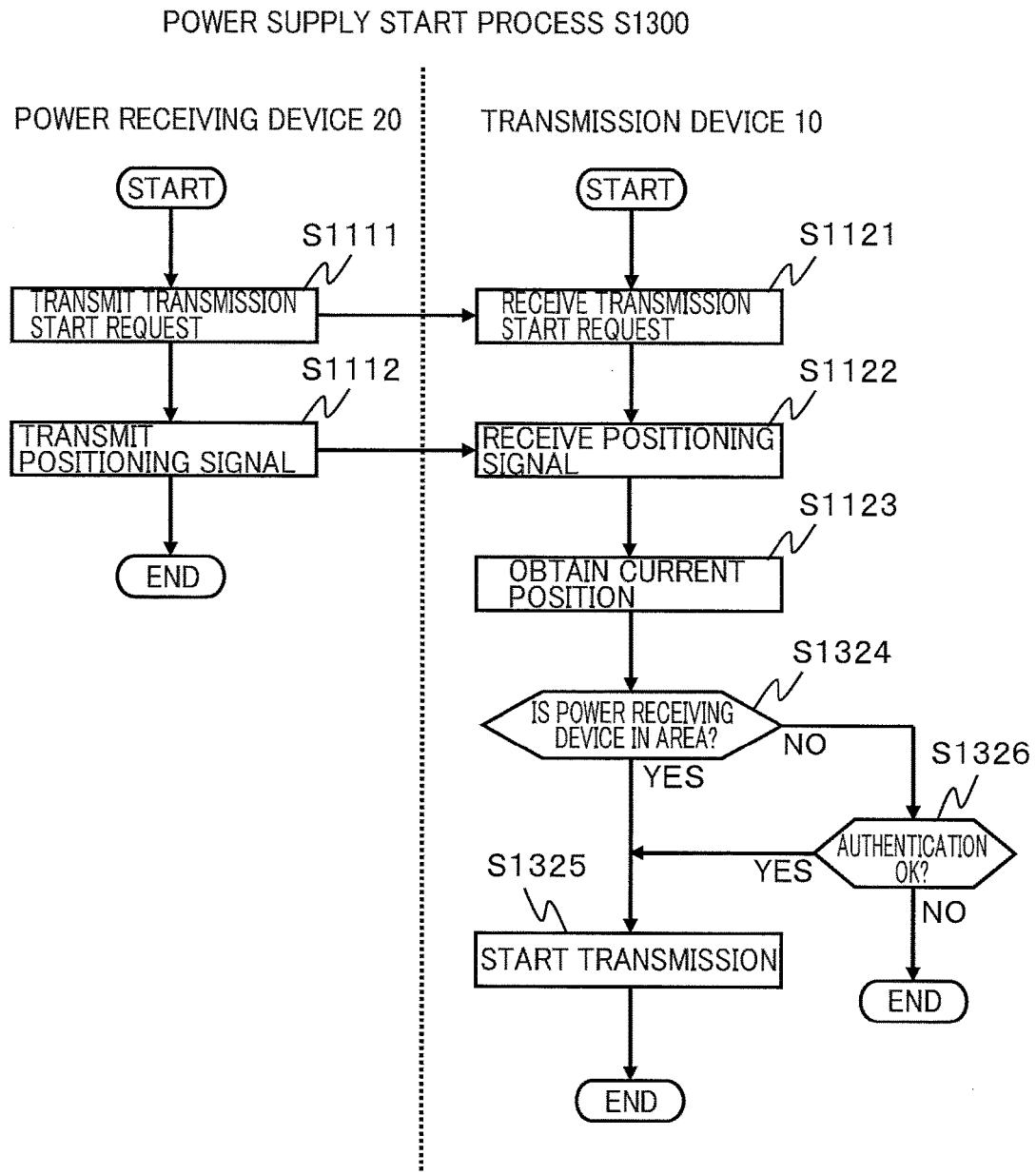
FIG. 13 is a flowchart describing a power supply start process S1300 according to one or more embodiments of the invention.

FIG. 13 is a flowchart explaining a power supply start process (below, referred to as power supply start process S1300) to be explained as the third embodiment. Processes S1111 to S1123 in the drawing are similar to that in FIG. 11.

In S1324, based on the current position of a power receiving device 20 determined in S1123, the transmission device 10 decides whether or not the power receiving device 20 is in a transmission area of the transmission device 10. In a case that the power receiving device 20 is in the transmission area of the transmission device 10(S1324: YES) the process proceeds to S1325, and in a case that the power receiving device 20 is not in the transmission area (S1324: NO) the process proceeds to S1326.

In S1325, the transmission device 10 starts power supply to the power receiving device 20.

In S1326, the transmission device 10 carries out authentication of the power receiving device 20. Specifically, the transmission device 10 checks authentication information that is transmitted from the power receiving device 20 against checking information of the transmission device 10. In a case that authentication succeeds (S1326: YES) the process proceeds to S1325, and in a case that authentication does not succeed (S1326: NO) the process ends. Note that, in a case that authentication does not succeed, the power receiving device 20 may display a message to such effect.

In this way, according to the power supply start process S1300 of this embodiment, in a case that the power receiving device 20 is outside the transmission area, authentication is performed before allowing power supply, so that such as power theft by the power receiving device 20 outside the transmission area can be prevented.

Note that, in the power supply start process S1300 in this embodiment, authentication process in the area can be performed, as explained in the second embodiment.

Fourth Embodiment

With the wireless power transfer system 1 in the first embodiment, the current position of the power receiving device 20 is obtained with the above-described positioning mechanism, but with the wireless power transfer system 1 in the fourth embodiment, the current position of the power receiving device 20 is obtained with a GPS provided to the power receiving device 20.

Figure 14:
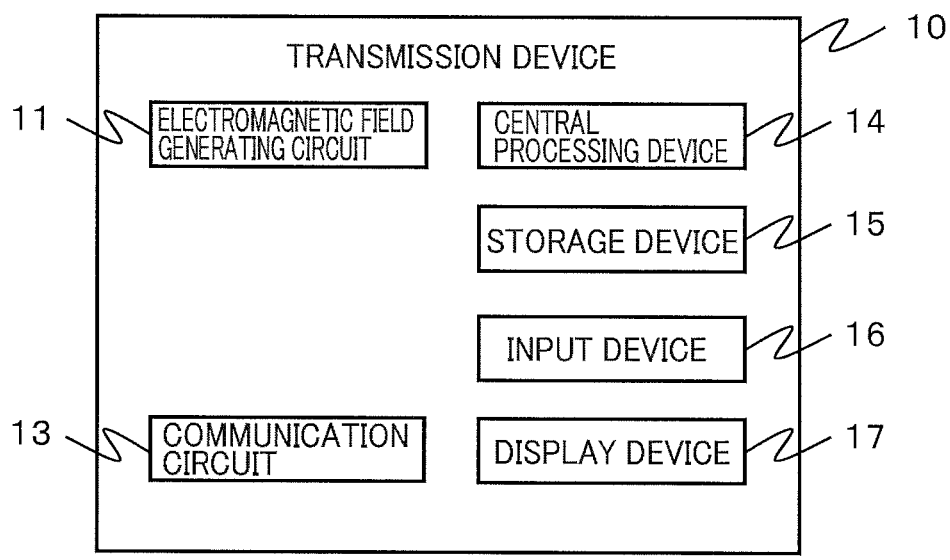
FIG. 14 describes a hardware configuration of the transmission device 10 according to one or more embodiments of the invention.

FIG. 14 is a hardware configuration of the transmission device 10 explained as the fourth embodiment. A basic hardware configuration of the transmission device 10 of the fourth embodiment is similar to that in the first embodiment. As shown in the drawing, the transmission device includes an electromagnetic field generating circuit 11, a communication circuit 13, a central processing device 14, a storage device 15, an input device 16 and a display device 17.

Figure 15:
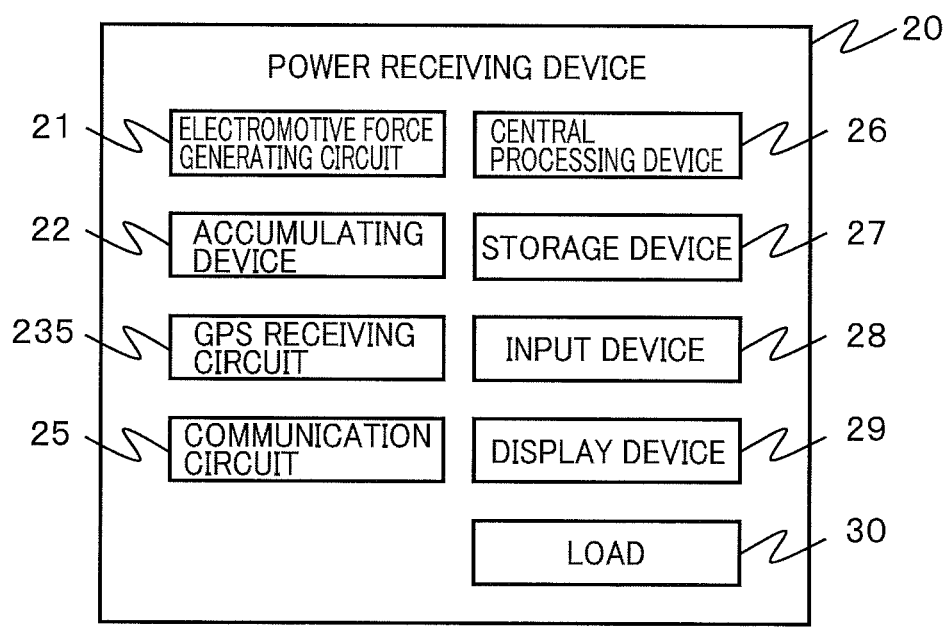
FIG. 15 describes a hardware configuration of the power receiving device 20 according to one or more embodiments of the invention.

FIG. 15 is a hardware configuration of the power receiving device 20 explained as the fourth embodiment. A basic hardware configuration of the power receiving device 20 of the fourth embodiment is similar to that in the first embodiment. As shown in the drawing, the power receiving device 20 includes an electromotive force generating circuit 21, an accumulating device 22, a GPS receiving circuit 235, a communication circuit 25, a central processing device 26, a storage device 27, an input device 28, a display device 29, and a load 30. The GPS receiving circuit 235 receives signals transmitted from a GPS satellite.

Figure 16:
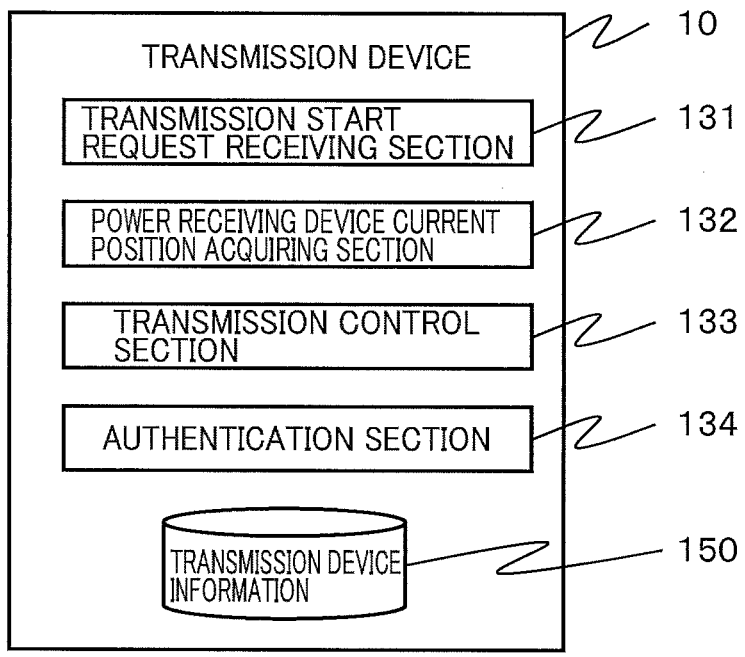
FIG. 16 describes main functions of the transmission device 10 according to one or more embodiments of the invention.

FIG. 16 shows the main functions of the transmission device 10 that is explained as the fourth embodiment. As in the drawing, the transmission device 10 includes a transmission start request receiving section 131, a power receiving device current position acquiring section 132, a transmission control section 133 and an authentication section 134. These functions are achieved with the hardware of the transmission device 10 or with the central processing device 14 of the transmission device 10 reading and executing programs stored in the storage device 15. Further, as shown in the drawing, the transmission device 10 manages transmission device information 150.

The power receiving device current position acquiring section 132 acquires information relating to the current position of the power receiving device 20 that is transmitted from the power receiving device 20. Other functions are similar to those in the first embodiment.

Figure 17:
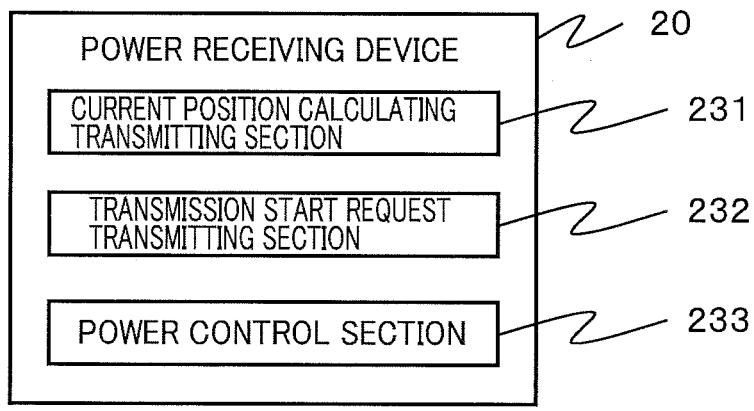
FIG. 17 describes main functions of the power receiving device 20 according to one or more embodiments of the invention.

FIG. 17 shows the main functions of the power receiving device 20 explained as the fourth embodiment. As shown in the drawing, the power receiving device 20 includes a positioning communication section 231, a transmission start request transmitting section 232 and a power control section 233. Of the above the current position calculating transmitting section 231 obtains the current position of the power receiving device 20 based on information that the GPS receiving circuit 235 has received and transmits the obtained current position to the transmission device 10. Other functions are similar to those in the first embodiment.

<Power Supply Start Process>

Figure 18:
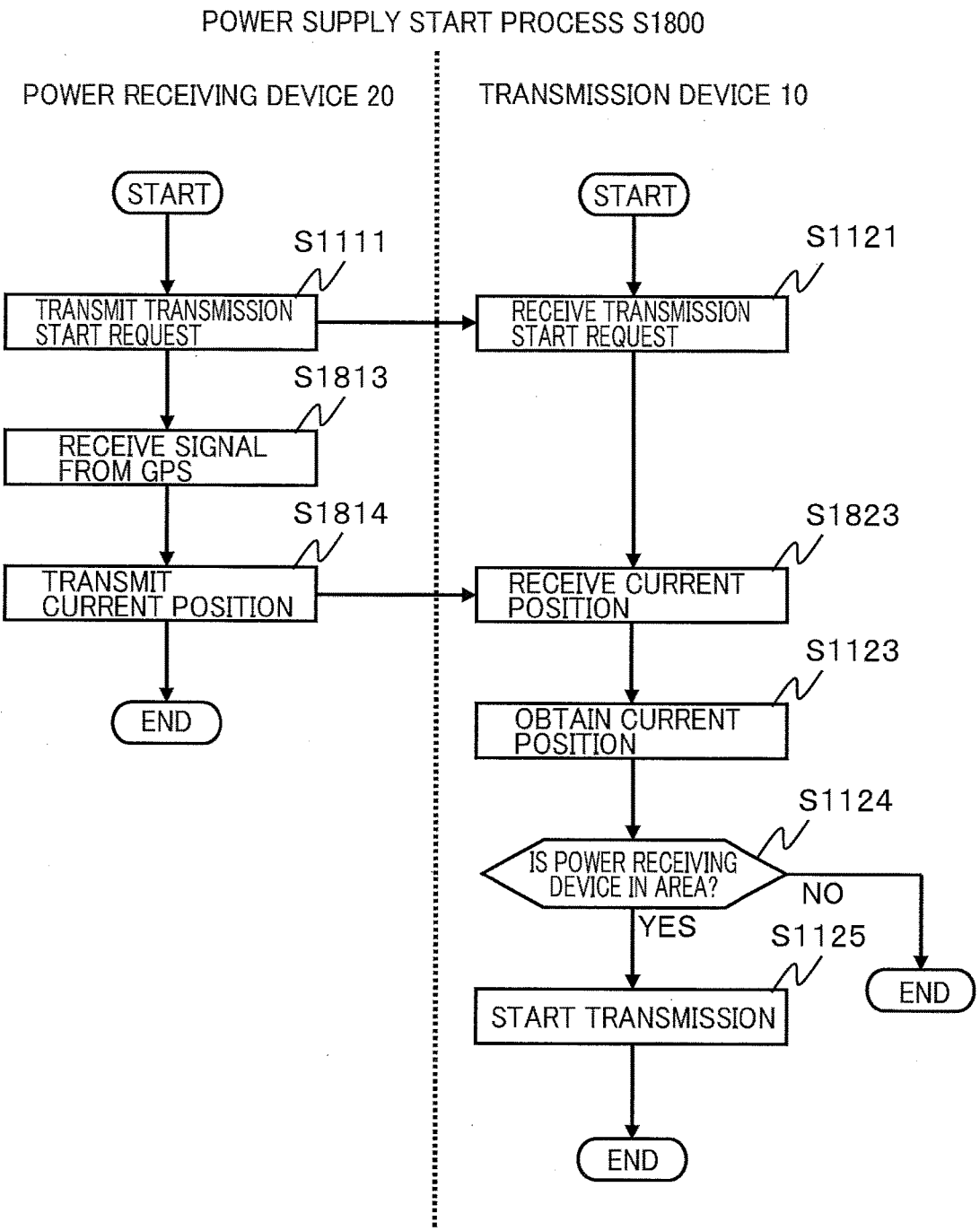
FIG. 18 is a flowchart describing a power supply start process S1800 according to one or more embodiments of the invention.

FIG. 18 is a flowchart explaining a power supply start process that is explained as a fourth embodiment (below, referred to as the power supply start process S1800). The power supply start process S1800 is carried out, for example, in a case where a user of the power receiving device 20 inputs a predetermined operation to the power receiving device 20.

As shown in the drawing, the power receiving device 20 transmits a transmission start request to the transmission device 10, and the transmission device 10 receives the transmission start request (S1111, S1121). The above transmission start request is attached with a power receiving device ID of the power receiving device 20 that is the sender. Note that, in a case that the power receiving device 20 does not have an accumulating device 22, for example, from an electromotive force generated with an electromotive force generating circuit 21 (or such as an antenna separately provided from the electromotive force generating circuit 21) due to an electromagnetic induction effect of an electromagnetic field supplied (transmitted, irradiated) from the transmission device 10, transmitting power of the above transmission start request and power for operating such as the central processing device 26 relating to executing processes and the communication circuit 25 is obtained.

The power receiving device 20 determines the current position of itself based on information transmitted from the GPS satellite (S1813), and transmits the determined current position to the transmission device 10 (S1814). Note that, it is not limited to the above configuration, and for example, the power receiving device 20 may determine the current position of itself in advance with GPS information, and the power receiving device 20 may transmit the current position before or at the same time as the transmission start request.

The transmission device 10 receives the current position transmitted from the power receiving device 20 (S1823). The processes S1124 and S1125 that the transmission device 10 performs following S1823 are similar to those in the first embodiment.

As explained above, according to the wireless power transfer system 1 of this embodiment, the current position of the power receiving device 20 can be accurately obtained with a simple configuration using the GPS. Therefore, whether or not the power receiving device 20 is in the transmission area can be accurately determined, and power supply from the transmission device 10 to the power receiving device 20 can be appropriately performed.

Note that, in a power supply start process S1800 of this embodiment, the authentication process in the transmission area explained in the second embodiment and the authentication process outside the transmission area explained in the third embodiment may be performed.

Fifth Embodiment

Subsequently, the wireless power transfer system 1 of the fifth Embodiment will be explained. A basic configuration (hardware configuration, function configuration) of the wireless power transfer system 1 of the fifth embodiment is similar to that in the first embodiment.

Figure 19:
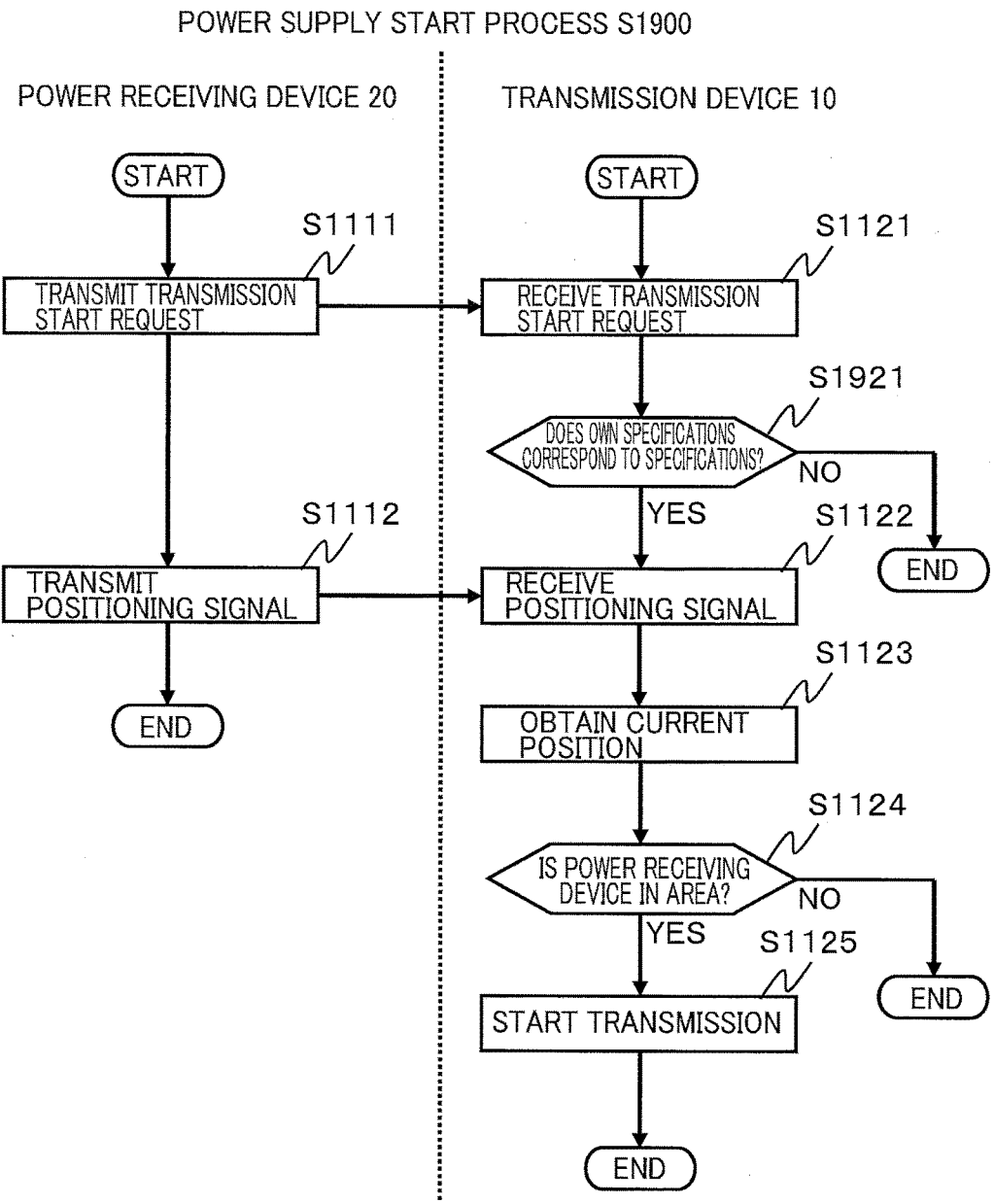
FIG. 19 is a flowchart describing a power supply start process S1900 according to one or more embodiments of the invention.

FIG. 19 is a flowchart explaining a power supply start process that is explained as the fifth embodiment (below, referred to as a power supply start process S1900). The power supply start process S1900 is carried out, for example, in a case where a user of the power receiving device 20 inputs a predetermined operation to the power receiving device 20.

Figure 20:
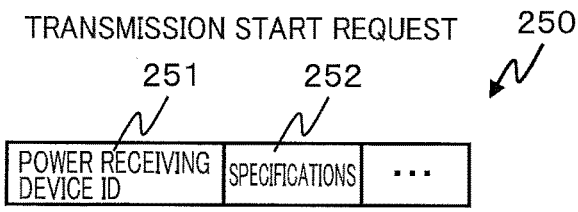
FIG. 20 describes an example of a transmission start request 250 according to one or more embodiments of the invention.

First, the power receiving device 20 transmits a transmission start request to the transmission device 10(S1111). FIG. 20 is a transmission start request 250 that is transmitted at this time. As shown in the drawing, the transmission start request 250 includes a power receiving device ID 251 and specifications 252. Of the above, the power receiving device ID 251 is set with the power receiving device ID allocated to each power receiving device 20. The specifications 252 is set with the specifications of the power receiving device 20 (charging voltage, charging current of the power receiving device 20, resonance frequency of the power receiving side coil, and the like).

Note that, in a case that the power receiving device 20 does not have an accumulating device 22, for example, from an electromotive force generated with an electromotive force generating circuit 21 (or such as an antenna separately provided from the electromotive force generating circuit 21) due to an electromagnetic induction effect of an electromagnetic field supplied (transmitted, irradiated) from the transmission device 10, transmitting power of the above transmission start request and power for operating such as the central processing device 26 relating to executing processes and the communication circuit 25 is obtained.

In a case that the transmission device 10 receives the transmission start request from the power receiving device 20, the transmission device 10 decides whether or not its own specifications correspond to specifications required by the power receiving device 20 (S1921). This decision is carried out by comparing the specifications 251 of the received transmission start request 250 and the specifications 151 of the transmission device information 150. For example, in a case that the transmission device 10 corresponds to the charging voltage, the charging current, and the resonance frequency which the power receiving device 20 is requesting, the transmission device 10 decides that it corresponds to the specifications required by the power receiving device 20.

In a case that the transmission device 10 corresponds to the specifications required by the power receiving device 20 (S1921: YES) the process proceeds to S1122, and in a case that the device 10 does not correspond to the specifications required by the power receiving device 20 (S1921: NO) the process ends. Note that, in S1921, in a case that the specifications of the transmission device 10 does not correspond to the specifications of the power receiving device 20, a message to such effect may be displayed to the power receiving device 20.

The processes after S1112 subsequent to S1921 are similar to those in the first embodiment.

As explained above, according to the wireless power transfer system 1 of this embodiment, only in a case that the transmission device 10 corresponds to the specifications relating to receiving power with the power receiving device 20, power is supplied from the transmission device 10 to the power receiving device 20, thus power is supplied safely from the transmission device 10 to the power receiving device 20.

Note that, also in the fifth embodiment, authentication process in the area explained in the second embodiment and authentication process outside the area explained in the third embodiment may be performed. Further, as explained in the fourth embodiment, the current position of the power receiving device 20 may be acquired using the GPS.

Sixth Embodiment

Figure 21:
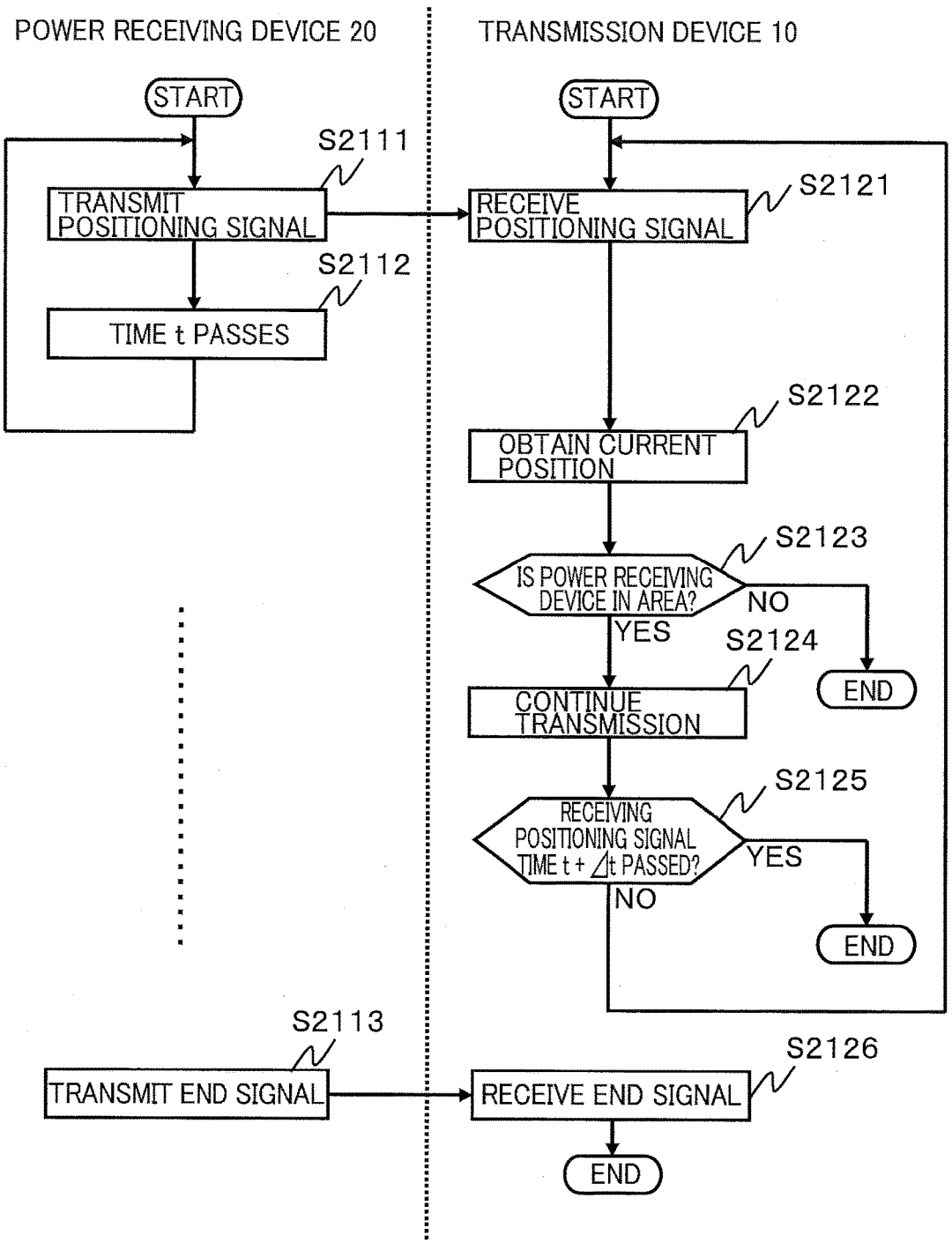
FIG. 21 is a flowchart describing a power supply process S2100 according to one or more embodiments of the invention.

FIG. 21 is a flowchart explaining other modes of power supply methods from the transmission device 10 to the power receiving device 20. Below, processes shown in this drawing (below, referred to as a power supply process S2100) is explained.

As shown in the drawing, after the power supply from the transmission device 10 to the power receiving device 20 has started, the power receiving device 20 transmits the positioning signal 700 in a predetermined time interval t (S2111, S2112).

In a case that the transmission device 10 receives the positioning signal 700 transmitted from the power receiving device 20 (S2121), the current position of the power receiving device 20 is obtained based on the received positioning signal 700 (S2122).

The transmission device 10 determines whether or not the power receiving device 20 is in its transmission area, based on the current position obtained in S2122 (S2123). In a case that the power receiving device 20 is in the transmission area of the transmission device 10 (S2123: YES), the transmission device 10 continues power supply to the power receiving device 20 (S2124), and then proceeds to S2125. On the other hand, in a case that the power receiving device 20 is not in the transmission area (S2123: NO), the transmission device 10 aborts power supply to the power receiving device 20.

In S2125, the transmission device 10 waits for a predetermined time (t+Δt) to receive the positioning signal 700 from the power receiving device 20. In a case that the positioning signal 700 is received within a predetermined time (t+Δt) (S2125: NO), the transmission device 10 continues power supply to the power receiving device 20, and then the process returns to S2121. On the other hand, in a case that the positioning signal 700 could not be received within the predetermined time (t+Δt) (S2125: YES), the transmission device 10 aborts power supply to the power receiving device 20.

On the other hand, the transmission device 10 monitors in real time whether or not it has received the transmission end signal from the power receiving device 20, and when it receives the power supply end signal transmission is aborted (S2113, S2126).

Seventh Embodiment

Figure 22:
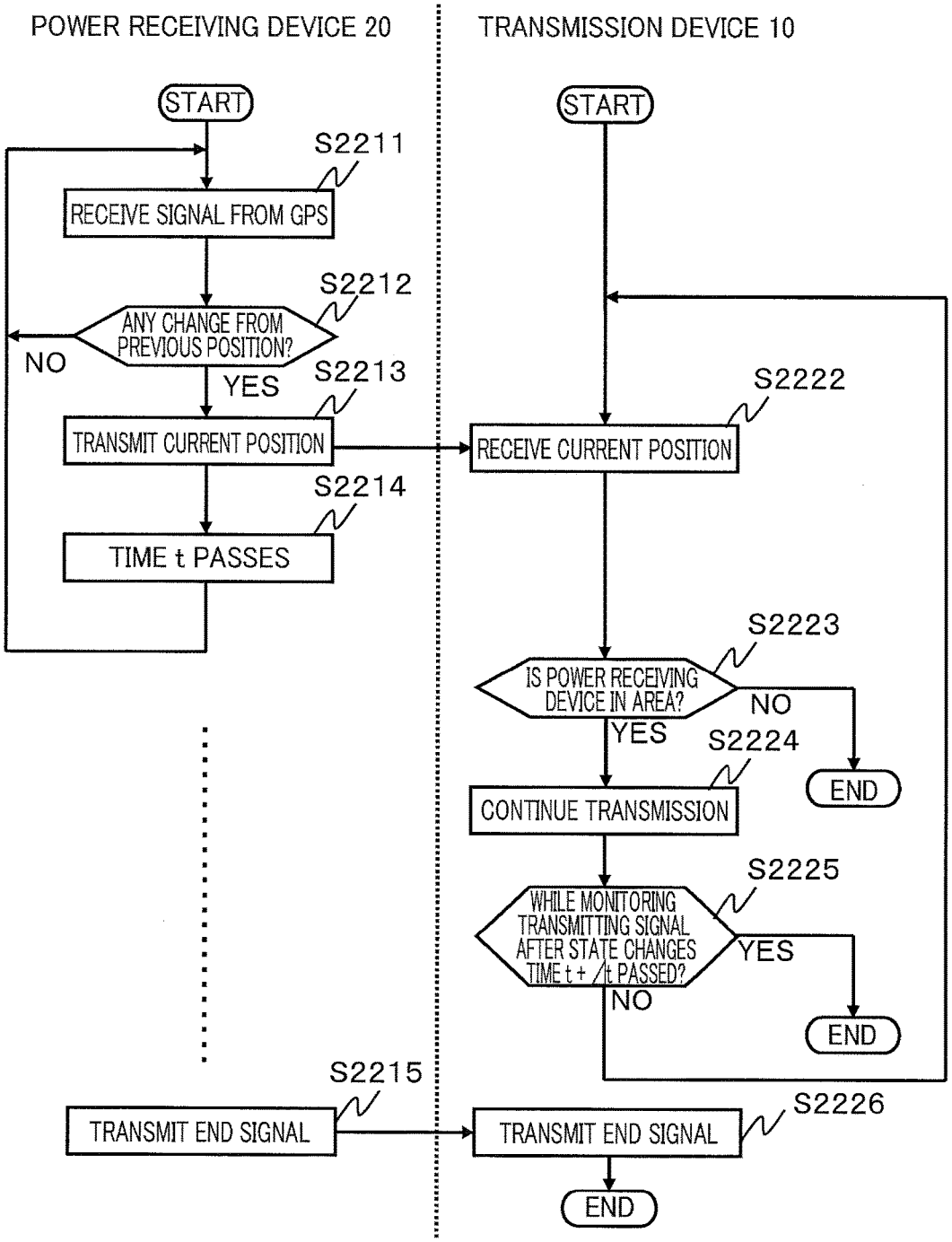
FIG. 22 is a flowchart describing a power supply process S2200 according to one or more embodiments of the invention.
Figure 23:
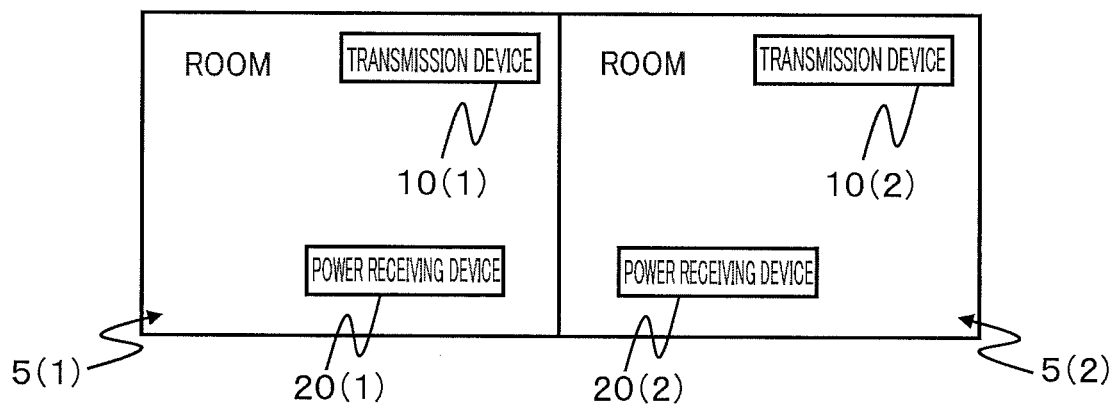
FIG. 23 shows a manner in which wireless power transfer is performed according to one or more embodiments of the invention.

FIG. 22 is a flowchart explaining other modes of power supply methods from the transmission device 10 to the power receiving device 20. Below, the processes shown in this drawing (below, referred to as power supply process S2200) is explained.

As shown in the figure, after starting power supply from the transmission device 10 to the power receiving device 20, the power receiving device 20 obtains its current position as required (every time t (S2214)) based on information transmitted from a GPS satellite, and determines whether or not the obtained current position is different from the previously obtained position (S2211, S2212). In a case that the current position is different from the previously obtained position (S2212: YES), the power receiving device 20 transmits the information showing the current position.

In a case that the transmission device 10 receives the information showing the current position from the power receiving device 20 (S2222), the transmission device 10 determines whether or not the power receiving device 20 is in its transmission area. In a case that the power receiving device 20 is in the transmission area of the transmission device 10 (S2223: YES), the transmission device 10 continues power supply to the power receiving device 20 (S2224), and then the process proceeds to S2225. On the other hand, in a case that the power receiving device 20 is not in the transmission area (S2223: NO), the transmission device 10 aborts power supply to the power receiving device 20.

In S2225, the transmission device 10 monitors such as the impedance state of the wireless power transfer system, and after the state changes waits for a predetermined time (t+Δt) to receive the positioning signal 700 from the power receiving device 20. In a case the transmission device 10 receives the positioning signal 700 from the power receiving device 20 within the predetermined time (t+Δt) (S2225: NO), the transmission device 10 continues power supply to the power receiving device 20, and then the process returns to S2222. On the other hand, in a case where the positioning signal 700 could not be received within the predetermined time (t+Δt) (S2225: YES), the transmission device 10 aborts power supply to the power receiving device 20.

On the other hand, the transmission device 10 monitors in real time whether or not it has received the transmission end signal from the power receiving device 20, and in a case that the power supply end signal is received the transmission is aborted (S2215, S2226).

Note that, the above explained embodiments are examples to facilitate understanding of this invention and does not limit this invention in any way. This invention may be modified or altered without departing from the scope thereof, and of course this invention includes its equivalents.

REFERENCE SIGNS LIST 1 wireless power transfer system, 10 transmission device, 20 power receiving device, 132 power receiving device current position acquiring section,
133 transmission control section, 134 authentication section,
150 transmission device information, 152 transmission area, 250 transmission start request

The invention claimed is:
1. A wireless power transfer system comprising:
  a transmission device that supplies power by wireless power transfer to a power receiving device;
  a position acquiring section that acquires a current position of the power receiving device;
  an authentication section that performs authentication of the power receiving device based on authentication information that is transmitted from the power receiving device; and
  a control section that:
    authorizes the power supply in a case where the power receiving device is within a predetermined three-dimensional area without performing the authentication,
    authorizes the power supply in a case where the power receiving device is outside the three-dimensional area and the authentication has succeeded, and prohibits the power supply in a case where the power receiving device is outside the three-dimensional area and the authentication has not succeeded.

2. The wireless power transfer system according to claim 1, wherein
the position acquiring section comprises a plurality of antennas arranged adjacent to each other, and
the position acquiring section:
receives a positioning signal from the power receiving device with the antennas,
determines a direction $\alpha$ of the power receiving device from the position acquiring section based on a phase difference $\Delta\theta$ of the positioning signal received with each of the plurality of antennas, and
acquires a current position of the power receiving device based on the determined direction $\alpha$.

3. The wireless power transfer system according to claim 1, wherein
the power receiving device comprises a GPS, and
the position acquiring section obtains a current position of the power receiving device that the power receiving device has acquired with the GPS and transmitted to the position acquiring section.

4. The wireless power transfer system according to claim 1, wherein
the control section authorizes the power supply in a case where the transmission device corresponds to specifications relating to receiving power of the power receiving device.

5. A wireless power transfer method for supplying power by wireless power transfer to a power receiving device, the method comprising:
acquiring a current position of the power receiving device,
performing authentication of the power receiving device based on authentication information that is transmitted from the power receiving device,
authorizing the power supply in a case where the power receiving device is within a predetermined three-dimensional area without performing the authentication,
authorizing the power supply in a case where the power receiving device is outside the three-dimensional area and the authentication has succeeded, and
prohibiting the power supply in a case where the power receiving device is outside the three-dimensional area and the authentication has not succeeded.

* * * * *